Jan. 31, 1961

C. D. SKIRVIN ET AL 2,969,800

CONTROL MEANS AND METHOD TO MAINTAIN PREDETERMINED PRESSURE IN A PRESSURE ZONE

Filed May 31, 1955

INVENTORS,
CLIFFORD D. SKIRVIN
WELDON B. ALLBAUGH
BY
ATTORNEY.

Jan. 31, 1961
C. D. SKIRVIN ET AL
2,969,800
CONTROL MEANS AND METHOD TO MAINTAIN PREDETERMINED
PRESSURE IN A PRESSURE ZONE
Filed May 31, 1955
3 Sheets-Sheet 2
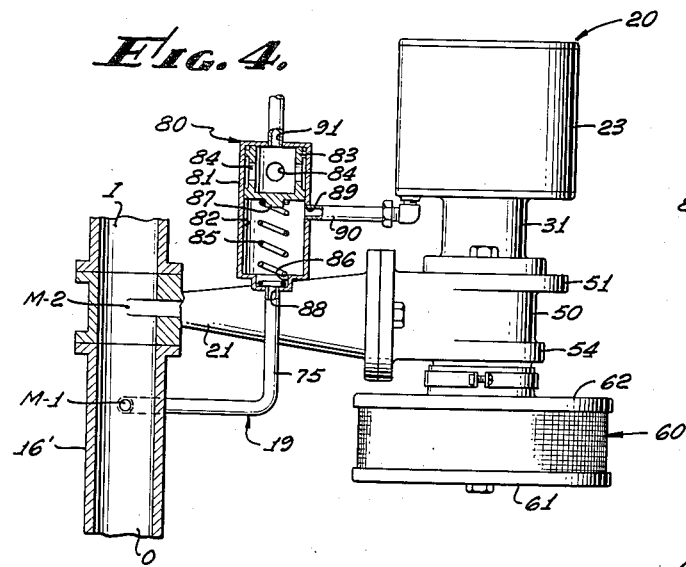
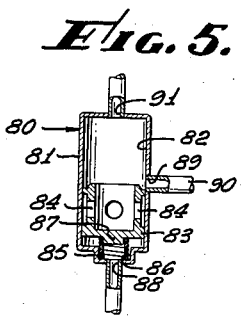
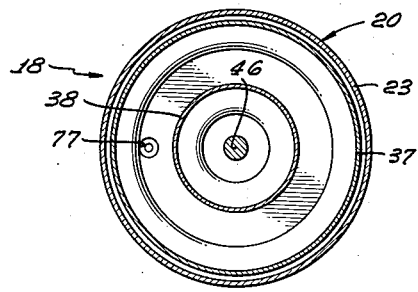
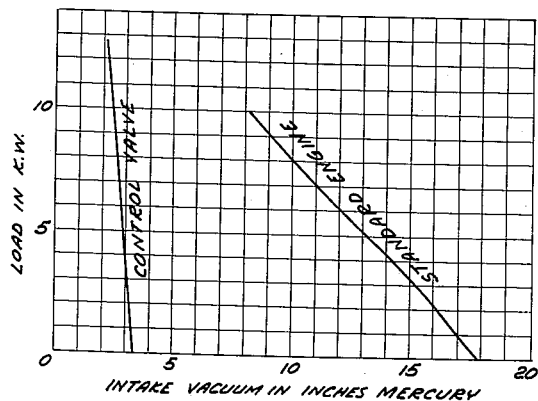
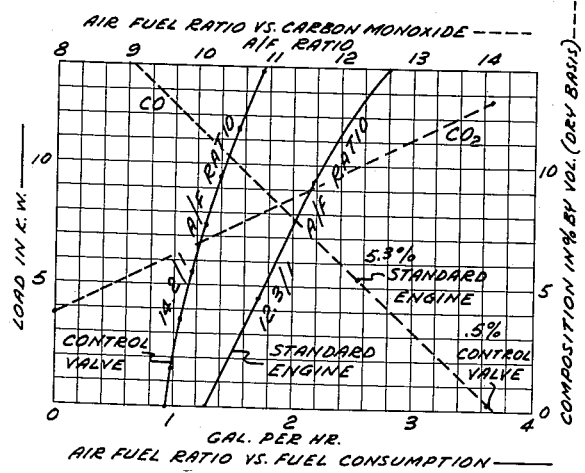
INVENTORS,
CLIFFORD D. SKIRVIN
WELDON B. ALLBAUGH
BY
ATTORNEY.

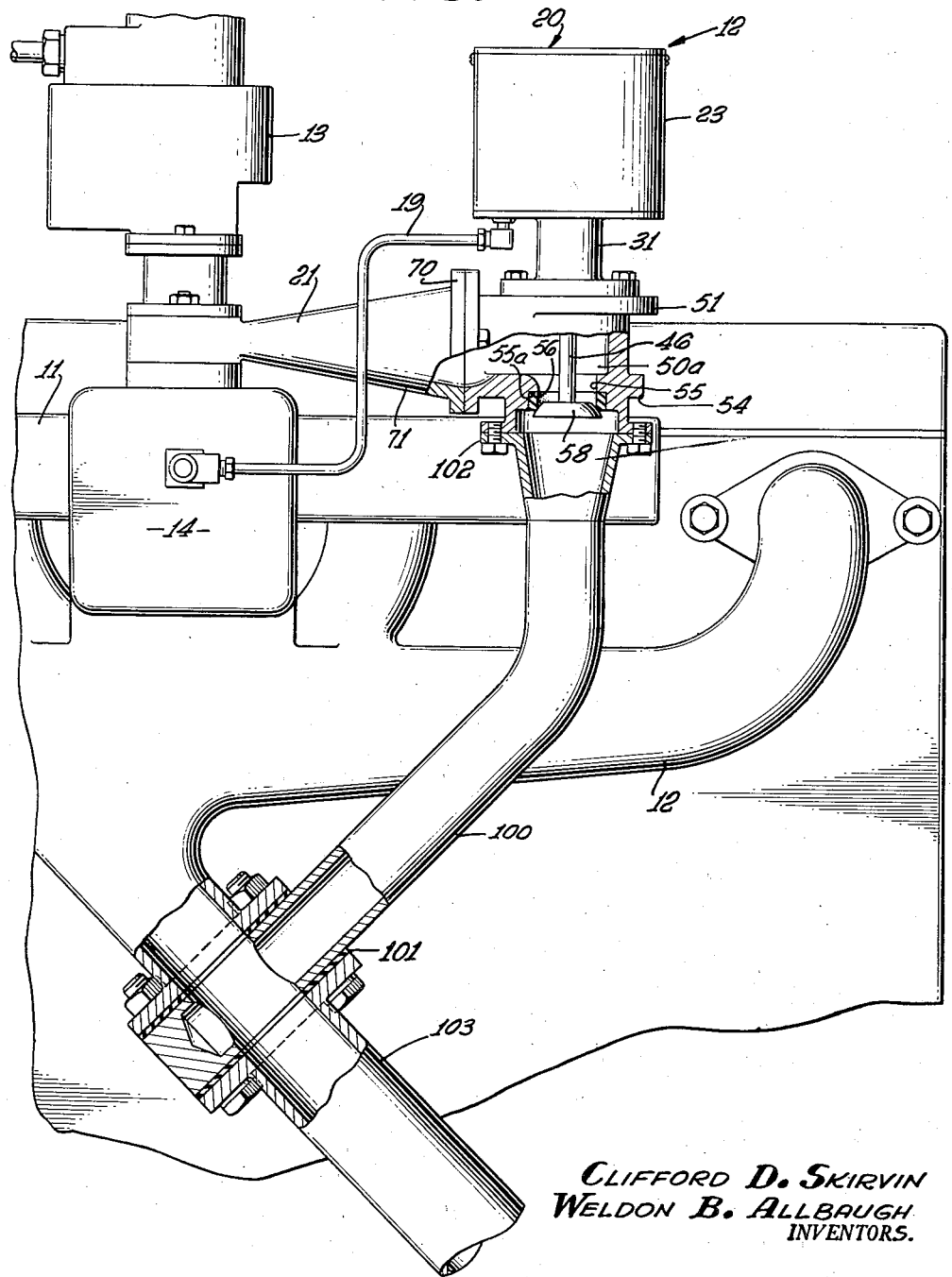

United States Patent Office 2,969,800
Patented Jan. 31, 1961

2,969,800

CONTROL MEANS AND METHOD TO MAINTAIN PREDETERMINED PRESSURE IN A PRESSURE ZONE

Clifford D. Skirvin and Weldon B. Allbaugh, Pomona, Calif., assignors, by mesne assignments, to B. H. Hadley, Inc., Pomona, Calif., a corporation of Delaware Filed May 31, 1955, Ser. No. 512,136

13 Claims. (Cl. 137—7)

This invention relates to manifold pressure control means for internal combustion engines and, more particularly, to a control means automatically responsive to pressure changes, created by demands of the engine, in an intake manifold to provide a selected relatively uniform manifold pressure under all conditions of operation of the engine to improve engine performance.

In an exemplary normally aspirated internal combustion engine, manifold pressure is below atmospheric pressure and may vary over a considerable range between maximum load conditions and minimum or zero relative load conditions (idling and deceleration). Such a variation in manifold pressure detrimentally affects overall engine efficiency, particularly with respect to the characteristics of the inducted charge of fuel mixture entering the combustion chamber. Some of these detrimental effects are particularly noticeable under idle and deceleration conditions. At idle condition (minimum manifold pressure or greatest intake vacuum) an air fuel ratio slightly greater than the lean limit of combustion is required by the engine. However, present normally aspirated engines provide an inducted charge of much heavier air fuel ratio under idle conditions because the suction developed by the engine pulls into the intake system more fuel than is required for the amount of air permitted to enter the engine under substantially closed throttle. As a result much of the excess fuel admitted to the combustion chamber is incompletely burned. Incomplete combustion produces a number of detrimental effects in the engine including a rapid build-up of carbon deposits in the engine, fouling of spark plugs, dilution of cylinder lubricants and contamination of the lubricating oils in the crank case, and the discharge through the exhaust system into atmosphere of undesirable fumes, smoke and incompletely burned products of combustion.

These detrimental effects on the engine considerablly shorten normal engine-operating life, increase wear on cylinder walls, decrease life of valves and valve seats, and result in poor fuel economy.

Exhaust gases in a normally aspirated internal combustion engine at idle condition or deceleration condition usually include a considerable amount of unliberated energy in the form of carbon monoxide, hydrogen, oxygen and methane gas ($CH_4$). Such unliberated energy is evidenced by exhaust fumes which contribute to the formation of an atmospheric condition, recently termed "smog," which has a detrimental effect on public health, retards plant growth, damages crops and exerts other undesirable effects. In some tests of exhaust gases of normally aspirated engines under idle conditions, as much as 25% to 30% of fuel loss has been indicated.

Such variation of manifold pressure prohibits optimum engine performance except under a selected condition of operation. Various other devices have been employed to modify various characteristics of the inducted charge into the combustion chamber but all of said prior proposed devices have resulted only in further complexity of the internal combustion engine.

The manifold pressure control means contemplated by this invention has for its purpose the maintenance of manifold pressure within a preselected narrow virtually uniform range under all conditions of operation of the engine so that optimum engine performance is substantially obtained between zero relative load and maximum load conditions. The manifold pressure differential range contemplated by control means of this invention may vary, for example, over nine-tenths or one inch of mercury, instead of a manifold pressure differential of the usual normally aspirated engine of approximately ten or more inches of mercury. In addition, the selected manifold pressure differential range may be located at only a few inches of mercury below atmospheric pressure whereas the wide range of a normally aspirated engine is disposed at eight and more inches of mercury below atmospheric pressure. Thus, the manifold pressure achieved by the control means of this invention provides operating manifold pressures relatively close to atmospheric pressure and has a relative supercharging effect.

Generally speaking, the maintenance of a manifold pressure differential within a selected range just below atmospheric pressure is achieved by providing a pressure-sensitive control valve which automatically variably opens to a source of pressure fluid to compensate for pressure variations within the intake manifold and to maintain pressure variations within a selected range. In this example, the control valve is in communication with atmospheric pressure for this purpose.

It is, therefore, among the objects of this invention to disclose and provide a novel control means for regulating pressure differential in an intake manifold of a normally aspirated internal combustion engine in response to demands of the engine.

An object of this invention is to disclose and provide a control means to maintain manifold pressure within a preselected range during all conditions of operation of the engine and to thereby achieve fuel economy by providing an air fuel ratio closer to the lean limit of combustion.

Another object of this invention is to disclose and provide a control means sensitive to intake manifold pressure differentials to control air fuel ratio of fuel mixture introduced to the manifold.

Another primary object of this invention is to disclose a novel method of maintaining a predetermined pressure in a zone of a conduit, such as a manifold, connected to one pressure at the inlet end and to a variable different pressure at the other and discharge end.

Another object of this invention is to disclose and provide a manifold pressure control means whereby characteristics of the inducted fuel charge to the combustion chamber is maintained more nearly uniform throughout all conditions of operation of the engine so as to achieve more complete combustion under all conditions of operation of the engine.

A further object of this invention is to disclose a control means for internal combustion engines which is responsive to demands created within the engine whereby more complete combustion is achieved and as a consequence, carbon deposits and hydrocarbon gums within the engine are inhibited, burning of lower octane fuels may be achieved without detonation, contamination of cylinder lubricants is reduced to a minimum, valve life is increased, and in general, engine life and maintenance is greatly improved.

A still further object of this invention is to disclose and provide a manifold pressure responsive control means whereby fuel consumption is decreased by causing operation of the engine on an overall leaner fuel air ratio.

A still further object of this invention is to disclose and provide a control means as mentioned above wherein more complete combustion is provided in the combustion chamber under all conditions of operation of the engine so as to provide a smoke-free, non-irritant exhaust residue or product and particularly to eliminate exhaust smoking during idling and deceleration conditions.

A still further object of this invention is to disclose and provide a control means for a normally aspirated internal combustion engine wherein manifold pressure is maintained at a higher level during all operating conditions of the engine and whereby the increased pressure conditions under which the engine operates results in ability to carry a greater maximum load.

Generally speaking, the manifold pressure control means contemplated by this invention includes a first and second passageway means in communication with the intake manifold system at spaced points in the flow path of a fuel mixture, one point of communication of the first passageway means being at the mixing chamber of the intake manifold and downstream with respect to the point of communication of the second passageway means adjacent to the carburetor discharge throat. A responsive means to pressure differential sensed at such spaced points is associated with the opposite ends of said passageway means and may include an outer bellows chamber in communication with the first passageway means and having a relatively large area. Isolated from the outer bellows chamber is an inner bellows chamber in communication with the second passageway means and having a pressure area substantially less than that of the outer bellows chamber. The inner and outer bellows chambers are closed at one end by a bellows head to which is fixed a valve stem which carries at its other end a valve head for seating on a valve port which, in one example, is open to atmosphere. The valve port and the inner bellows chamber are in communication with the second passageway means.

Generally speaking, a change in manifold pressure created by a change in engine demand is first sensed at the first pressure sensing point and this change is immediately communicated to the outer bellows chamber. If the change sensed is an increase in vacuum or reduction in manifold pressure, the bellows head is caused to move in a direction to open the valve port to atmosphere to admit only sufficient air under atmospheric pressure to modify the manifold pressure to the preselected narrow operating range. In the event the manifold pressure sensed at the first passageway means indicates an increase in pressure, such increase in pressure is communicated to the outer bellows chamber to urge the bellows head in a direction to close the valve port to atmosphere so that air under atmospheric pressure will not be admitted to the intake manifold. Within the narrow selected range of manifold pressure permitted by the control means of this device the valve member will rapidly variably open to compensate for manifold pressure occurring in said range. When manifold pressure tends to exceed the upper and lower limits of the selected pressure range, the valve member will tend to stay either fully opened or almost closed until the manifold pressure has been brought within the preselected range.

The manifold pressure control means above described includes a novel method of maintaining a selected subatmospheric pressure in a conduit means (manifold) connected to atmospheric pressure at an inlet end and variable subatmospheric pressure at the other and discharge end by continuously sensing pressure in a zone adjacent the discharge end, and by admitting gas under atmospheric pressure into said conduit at a point upstream from said zone in accordance with deviation of sensed pressure from the selected subatmospheric pressure. While atmospheric and subatmospheric pressures are referred to in this example, it is understood that pressures in the system may be above atmospheric pressure.

Numerous other objects and advantages of this invention will be readily apparent from the following description of the drawings in which exemplary embodiments of this invention are shown.

In the drawings:

Fig. 3 is a transverse sectional view taken in a horizontal plane indicated by line III—III of Fig. 2;

Fig. 4 is a side elevation of a control means embodying a modification of this invention, an auxiliary control valve being shown in section and in open position;

Fig. 5 is a sectional view of the auxiliary control valve in closed position;

Fig. 6 is a graph illustrating intake vacuum in inches of mercury of a normally aspirated internal combustion engine and intake vacuum of the same engine equipped with control means of this invention;

Fig. 7 is a graph showing curves load versus fuel consumption and composition of exhaust in percent by volume (dry basis) versus air fuel ratio for a normally aspirated engine and the same engine equipped with control means of this invention; and Fig. 8 is a side view of an engine illustrating a control means embodying this invention connected with the exhaust pipe of the engine.

Figure 1:
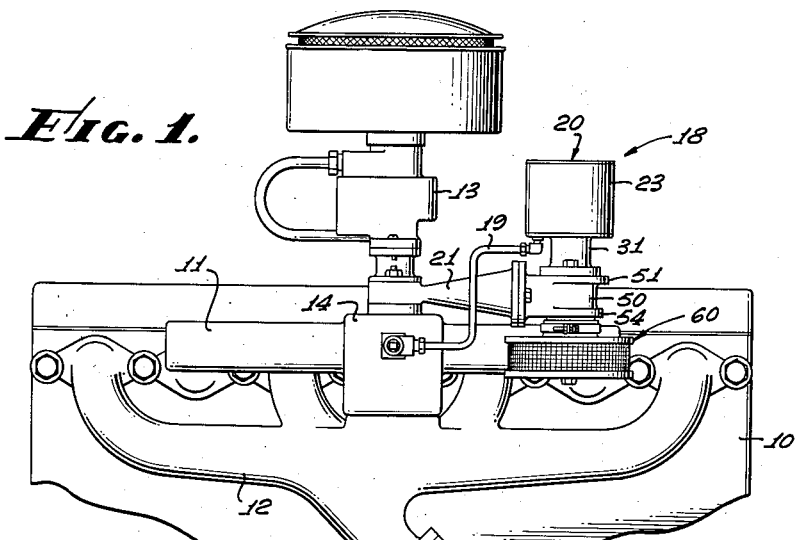
Fig. 1 is a side view of an engine to which a control means embodying this invention is associated.

In general, an internal combustion engine partially illustrated in Fig. 1 may be of any well known manufacture and may comprise a cylinder block 10 having associated therewith in well known manner an intake manifold or conduit means 11 and an exhaust manifold 12. The intake manifold 11 and exhaust manifold 12 communicate with cylinder combustion chambers in the engine block 10 through valve means in well known manner. A carburetor means 13 is in communication with a mixing chamber 14 of the intake manifold and provides a selected air-fuel mixture in accordance with the design of the carburetor. The carburetor 13 may be of standard make and manufacture and includes a throttle valve 15 in discharge throat 16 of the carburetor to control flow of fuel mixture to the intake manifold. It is understood that all of the parts mentioned above may be well known engine parts, do not form a part of this invention, and are therefore illustrated generally.

A manifold pressure control means generally indicated at 18 is associated with the engine and includes a first passageway means 19 extending between a selected pressure point M–1 in mixing chamber 14 and a pressure responsive means 20. A second pasageway means 21 extends between a second selected pressure point M–2 upstream of M–1 just below throttle valve 15 and one end or lower portion of responsive means 20. It will thus be apparent that the pressure responsive means 20 is in communication with two spaced points or pressure areas in the flow path between the carburetor and the combustion chambers in the engine. The location of pressure point M–1 is exemplary only and it may be located at other points in the intake manifold system spaced from the second pressure point M–2. The spacing between the two pressure points M–1 and M–2 may be varied if desired. It is also apparent that point M–1 will be first responsive to pressure changes in the manifold emanating from the direction of the combustion chambers in the engine. Point M–2 will be sensitive to pressure changes at an incremental later time instant. There is thus established a zone for sensing pressure differential between points M–1 and M–2 in accordance with variable low subatmospheric pressure demands made by the engine upon the intake manifold system.

The means 20 responsive to such pressure differential between points M–1 and M–2 may comprise a hollow cylindrical valve body 23 defining a valve chamber 24.

The valve body 23 may include a cylindrical wall 25, one end of which is closed by a top end wall 26 secured thereto in any convenient manner. The end wall 26 may include a seal ring 27 mounted in a circumferential groove in the edge face of end wall 26. Centrally of end wall 26 may be provided an internal recess 28 and a coaxial port or orifice 29 providing communication between chamber 24 and atmosphere. Orifice 29 is of a selected diameter, for example 1/16 or 1/8 inch. If desired, an adjustable metering valve of suitable type may be used in place of orifice 29 to vary the flow rate of air between the valve chamber and atmosphere.

At its other end valve chamber 24 may be closed by a base member 31, said base member including a top circular end wall 32 fitted within cylindrical wall 25. The base member 31 includes cylindrical portion providing a central axial bore 33 of selected diameter terminating in a reduced bore 34 providing communication to one end of the passageway means 21. A bottom flange 35 on base member 31 affords a connection to the passageway means 21 as described hereinafter.

Within valve chamber 24 is mounted a bellows means including concentrically arranged outer bellows 37 and inner belows 38 coaxial with bore 33 and chamber 24. Bellows 37 and bellows 38 may be of well known make and manufacture and are selected with different spring or callapse rates to stabilize action of said bellows means and to avoid fluttering or chattering under rapidly changing pressure conditions as later described. The effective resultant spring rate of the bellows 37 and 38 is selected to provide response of the bellows means at a preselected pressure condition at M-1. Extending over the top of the bellows means may be a circular flat bellows head 39 having downwardly directed, concentrically arranged, annular ribs 40 and 41 to attach and secure thereto the top ends of outer bellows 37 and inner bellows 38 respectively. Similarly, the opposite end wall 32 is provided with concentrically arranged, upstanding, annular ribs 42 and 43 to attach and secure thereto the opposite ends of said bellows 37 and 38 respectively.

The bellows head 39 may be provided with a threaded axial bore 45 for adjustable threaded connection to one end of a depending valve stem 46. This end of valve stem 46 may extend above the bellows head 39 for threaded connection to a locking nut 47. The valve stem 46 extends through bore 34 in relatively loose-fitting relation with walls of said bore so as to permit communication between passageway means 21 and inner bellows chamber 48 defined by the inner bellows 38.

The passageway means 21 includes a duct means comprising a hollow member 50 providing a chamber 50a and having a top wall 51 provided with threaded bores to receive stud bolts 52 for securement of flange 35 on the base member 31 thereto. The top wall 51 has an enlarged opening 53 opposite bore 34 through which valve stem 46 extends. Bottom wall 54 of member 50 is provided with a valve port 55 aligned with bore 34. An annular shoulder 55a provides a seat for a resilient, annular valve seat member 56. The valve seat member 56 affords a tapered seat as at 57 for a valve head 58 carried at the bottom end of valve stem 46. Under normal atmospheric conditions the valve head 58 is biased to closed position by the bellows means. The valve port 55 opens to atmosphere, in this example, and to prevent contamination of air passing into the intake manifold a suitable air filter means generally indicated at 60 may be mounted on member 50. The air filter means 60 may be of any suitable construction and as exemplarily illustrated may include a bottom circular wall 61 and a top circular wall 62, each provided with means to secure therebetween an annulus of fibrous, air-filtering material 63. The top wall 62 includes an upstanding cylindrical flange 64 which may be sleeved over lower portion 65 of bottom wall 54 and secured thereto by a clamping ring 66.

The member 50 is provided with a side opening 68 defined by a flange 69 for connection to a flange 70 provided on one end of a duct member 71. The duct member 71 may be of any suitable cross sectional area and terminates in an opening 72 to a collar 73 which may be readily positioned and secured between the connecting flanges of the mixing chamber 14 and of the lower end of the carburetor. The collar 73 may have substantially the same inner diameter as the carburetor discharge throat 16 for flow of fuel mixture therethrough. The opening 72 communicates with carburetor throat 16 at approximately the point M-2.

The first passageway means 19 may include a suitable metal tube member 75 connected at one end by a fitting 76 to a port 77 in end wall 32 leading to outer annular bellows chamber 78 which is defined by the annular space between the outer and inner bellows 37 and 38. The opposite end of tube member 75 may be connected to a suitable fitting 79 fixed to the wall of the mixing chamber 14 and providing communication with the mixing chamber at approximately point M-1.

Figure 2:
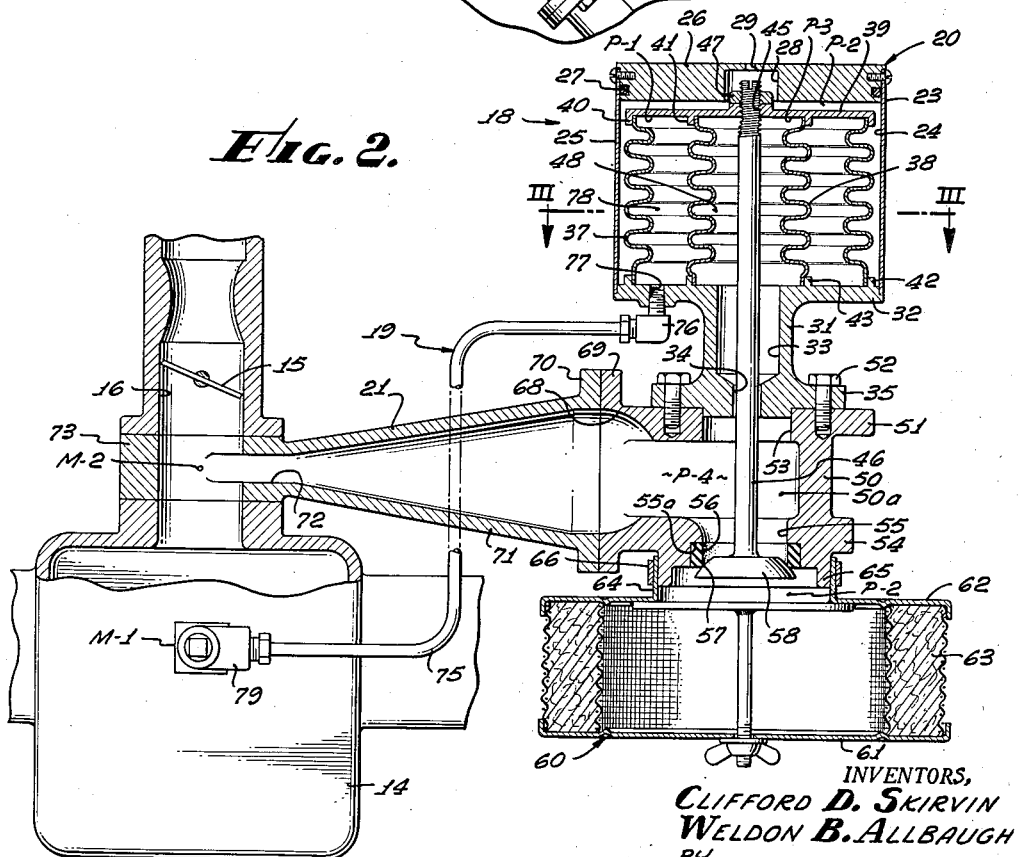
Fig. 2 is an enlarged sectional view taken in a vertical plane passing through the control means of this invention and a portion of the carburetor and mixing chamber of the intake manifold.

Pressure areas and points in the control means subjected to changes in pressure at M-1 and M-2 are identified as P-1, P-2, P-3 and P-4, shown in Figure 2. Pressure area P-1 may comprise the annular area of the bottom face of bellows head 39 defined by the outer and inner bellows. Bellows chamber 78 is in communication with M-1 in the mixing chamber so that pressure area P-1 is subjected to varying pressures occurring at M-1.

Pressure area P-2 may comprise the top circular face of bellows head 39 and is normally subjected to atmospheric pressure, orifice 29 being open to atmosphere. P-2 may vary from atmospheric pressure depending upon movement of the bellows head. The restricted orifice 29 serves to dampen movements of the bellows head by restricting flow of air therethrough.

Pressure area P-3 may comprise the circular area on the bottom face of the bellows head defined by annular rib 41 less the cross-sectional area of the valve stem 46.

Pressure P-4 comprises pressure conditions within the chamber 50a provided by member 50. Changes in pressure at P-4 are communicated to the inner bellows chamber 48 and to P-3, such changes being transmitted through the restricted opening provided by the loose fit of stem 46 with bore 34 and occurring at an incremental later time instant.

Generally speaking, a change in manifold pressure resulting from a change in the demands of the engine emanates from the direction of the combustion chambers in the engine block. Such pressure change is first noticed at M-1 and the first passageway means 19 transmits the change of pressure to pressure area P-1 in chamber 78. At this moment it may be considered that pressure at M-2 is also present at P-4 and at P-3. When the pressure change is negative, or decrease in pressure occurs, the bellows head is moved downwardly because of the difference in pressure at P-1 and P-3. It is understood that the spring force of the bellows means is exceeded by the pressure at P-1. Immediately upon downward movement of the bellows head the valve head 58 unseats to permit air at atmospheric pressure to enter into chamber 50a and the second passageway means 21. Such opening of valve head 58 immediately causes pressure increase in the second passageway means 21 at P-4, at P-3 and at M-2. When valve 58 is open for a sufficient increment of time to overcome pressure differential between P-1 and P-3, valve head 58 will close because the bellows head 39 will be urged upwardly. For change in pressure which affects point M-1 the bellows head will respond thereto to actuate valve head 58 so that pressure at M-2 will be first modified and at an incremental time instant later pressure at M-1 will be modified because of flow of air and fuel is from M-2 towards M-1. Pressure differential between M-1 and M-2 may thus be controlled to a selected narrow range so that manifold pressure is relatively uniform.

In a normally aspirated engine, manifold pressure will be greater when using the control means of this invention and will more closely approach atmospheric pressure.

When an engine is under idle condition, it is understood that zero relative load is imposed on the engine, throttle 15 is substantially closed, and in a normally aspirated engine, manifold pressure is at a minimum. Minimum manifold pressure produces the greatest suction force on the fuel jets in the carburetor means with the result that excess fuel is sucked into the intake manifold, distributed to the combustion chamber and a large percentage of fuel is unburned and passes out of the exhaust system.

The control means of the present invention alleviates this condition because at idle condition manifold pressure is maintained at a selected pressure. Under idle condition, suction produced in the intake manifold is immediately sensed at M-1, and responsive means 20 causes valve head 58 to open to its widest position. In an exemplary model the opening may be .085 inch. Such openening of valve head 58 increases the manifold pressure to selected range. As a result, suction acting on the fuel jets is reduced to a predetermined amount and the fuel introduced to the engine is only a desired amount. In addition, the air-fuel ratio is leaner. This is desirable under idle condition because the load demands on the engine are at a minimum. It is understood that opening of valve head 58 is not sufficient to exceed the lean limit of combustion. It should also be noted that maintenance of manifold pressure within a substantially uniform range permits the volume of the inducted charge of air-fuel mixture to be more uniform and thereby more complete burning under idle conditions is achieved. As a further result, idling at lower revolutions per minute is possible without stopping of the engine due to lack of air.

Under conditions of deceleration the normally aspirated combustion engine acts in substantially the same manner as that described for idle condition except that r.p.m. of the engine is greater. The throttle valve is virtuallly closed, load condition is at a minimum, and intake manifold pressure is at a minimum which means that a large suction force is acting on the carburetor means. In deceleration this condition is perhaps more aggravated because of increased r.p.m. of the engine. The control means of this invention is responsive to the suction demand made on the intake manifold by engine motor operating at a relatively high r.p.m. in a manner similar to that described for idle condition. The responsive bellows means causes opening of valve 58 to atmosphere to confine pressure in the intake manifold within a preselected range.

Under acceleration conditions, it will be understood that the throttle valve is in open position to permit greater flow of air and fuel mixture into the engine and manifold pressure is at maximum. Such a large amount of air is usually introduced under this maximum load condition that in present engines air-fuel ratio becomes leaner instead of enriched so that a desired amount of energy to meet engine demand does not reach the combustion chamber. As a result, present engines employ accelerating pumps or other devices to enrich the mixture.

Under acceleration with an engine provided with the control means of this invention valve head 58 is maintained at almost closed position because pressure in intake manifold at M-1 is proximate to maximum pressure limit of the selected pressure range. However, some air is introduced into second passageway means 21 and into the carburetor discharge throat area. Injection of auxiliary air at M-2 reduces the amount of air inducted through the carburetor means with an overall result of enriching the fuel mixture. Thus, the engine demand for a richer fuel or more energy is satisfied.

Under conditions of normal running operation, it is understood that the throttle valve is partially open and manifold pressure is close to maximum. The valve head 58 constantly fluctuates up and down in response to pressure variations sensed at M-1 so as to maintain a virtually uniform manifold pressure. At the same time air introduced to the manifold through the control means of this invention provides a slightly leaner air-fuel ratio with resultant fuel economy.

It will be understood that in the various conditions of operation of the engine discussed above, the responsive means 20 is continuously functioning by rapid reciprocal movement of the valve head 58. Valve travel of valve head 58 is rapid and is reflected in engine speed. At high r.p.m.s exemplary valve travel may be approximately .030 inch. During deceleration or idling where r.p.m. is being reduced or is at a low rate, travel of valve head 58 may be approximately .085 inch. Rapid variable opening of valve head 58 is dampened by difference in spring rate between the outer and inner bellows 37 and 38 and by dampening effect of orifice 29.

The manifold pressure control means of this invention employs a novel method of maintaining a predetermined subatmospheric pressure in a conduit means which, at the inlet end (carburetor throat), is connected to virtually uniform atmospheric pressure, and which, at the discharge end or zone (manifold passages leading to the combustion chambers) is connected to a variable low subatmospheric pressure. Pressure of gases flowing from inlet end to discharge are continuously sensed in a zone adjacent the discharge end at which a predetermined subatmospheric pressure is desired. As pressure deviates from desired pressure, air or gas is admitted at atmospheric pressure or higher at a point upstream from the sensing zone. The admitted gas under higher pressure modifies the pressure at the sensing zone until the predetermined pressure is reached.

It is understood that pressures at the inlet end of the conduit, variable pressures at the discharge end, and pressure of admitted gases may be other than atmospheric or subatmospheric and such a method may be used on supercharged engines and various other industrial applications where variable pressures may exist at one end of a conduit means.

In Fig. 6, manifold pressure characteristics are indicated of a normally aspirated engine equipped with control means of this invention and the same engine without control means. In Fig. 6, the curve marked Y relates to a standard engine (without the control means) and indicates range of intake vacuum in inches of mercury for 0 to 10 kilowatt loads. At zero load, intake vacuum in inches of mercury is slightly less than eighteen whereas at maximum load intake vacuum is slightly greater than eight inches of mercury. Thus, manifold pressure of the standard engine varied about 10 inches of mercury.

Curve X indicates manifold pressure range of the same engine with the control means of this invention. Curve X indicates that at zero load manifold pressure is approximately 3.3 inches of mercury, and at ten kilowatt load, manifold pressure is about 2.2 inches of mercury. This curve further indicates that maximum load has been increased to about 12.8 kilowatts at which intake vacuum was slightly greater than two inches of mercury. It will thus be clearly apparent that the narrow pressure range of between 2.2 and 3.3 inches of intake vacuum in the manifold provides a relatively uniform manifold pressure range under all loads as compared to the extremely wide range of manifold pressure normally found in a standard engine. Maintenance of manifold pressure at a level closer to atmosphere also resulted in a substantial power increase.

In Fig. 7 is shown a chart indicating fuel consumption in gallons per hour versus load in kilowatts for a standard engine and for the same engine with the control means of this invention. The line labeled standard engine indicates consumption of a fuel mixture inducted at an air fuel ratio of 12.3. At zero load about 1.25 gallons per hour were consumed. At maximum load of 10 kilowatts about 2.28 gallons per hour were used. The curve labeled control valve indicates consumption of fuel mixture inducted at an air fuel ratio of 14.2 utilizing the control means of this invention. At zero load .92 gallon per hour was used while at a 10 kilowatt load about 1.43 gallons per hour were used. These curves indicate substantial reduction in fuel consumption.

Also in Fig. 7 are indicated curves showing carbon dioxide ($CO_2$) content and carbon monoxide (CO) content of exhaust products of combustion for air fuel ratios upon which the fuel consumption curves were computed. For the standard engine carbon monoxide (CO) in exhaust products was approximately 6.3% per volume on dry basis. In the engine with the control means of this invention carbon monoxide (CO) in exhaust products was only .05% per volume on dry basis. Testing of carbon monoxide (CO) content in exhaust products indicates the effectiveness of combustion in the chambers and is a measure of the amount of energy utilized by the engine.

It will be readily understood by those skilled in the art that the control means of this invention may be utilized in association with the exhaust manifold 12 in order to recirculate a selected amount of exhaust gases and to maintain a selected uniform pressure in the manifold chamber by said exhaust gases. In such an arrangement (Fig. 8) air filter 60 may be removed and a suitable conduit 100 connected as at 101 and 102 respectively between the exhaust pipe 103 at the exhaust manifold and the valved port 55. The conduit 100 between the exhaust pipe 103 and port 55 may be made of any suitable material and of selected flow characteristics so as to conduct a desired amount of exhaust gas from the exhaust pipe. The amount of exhaust gases introduced into the intake manifold through the valved port 55 is determined by the action of the responsive means 20 in sensing pressure differential between points M-1 and M-2. Introduction of exhaust gases into the intake manifold in this manner produces certain beneficial effects under certain conditions of operation of an engine. For example, detonation may be virtually eliminated. It is understood other beneficial effects may be produced by recycling exhaust gases and it is intended that the control means of this invention be utilized in such an arrangement if desired.

In Fig. 4 is illustrated a modification of the control means embodying this invention wherein an auxiliary control valve is provided to permit maintenance of two distinct uniform pressure ranges at the discharge end of a conduit means depending upon variable pressure conditions acting at said discharge end.

In Fig. 4 in place of an engine with an intake manifold and exhaust manifold a conduit means 16' is illustrated having an inlet end I and a discharge end O defining a zone for flow of fluid under pressure. Point M-2 is indicated adjacent the inlet end I and point M-1 is indicated adjacent the discharge end O, point M-2 being opposite the second passageway means 21 of a responsive means 20 such as described above. The responsive means 20 is of the same structure as that shown in Fig. 2 and is not described again in detail.

The auxiliary second control valve 80 may be selectively positioned between sensing point M-1 and the pressure area P-1 in responsive means 20. In this example the first passageway means 19, which includes the tube 75, may include a valve housing 81 defining a valve chamber 82 of cylindrical form. Within the valve chamber 82 may be provided a cup-shaped piston head 83 provided with a plurality of side ports 84. The piston head 83 may be biased toward one end of chamber 82 by a selected coil spring 85 having one end positioned in a recess 86 at one end of chamber 82 and its other end positioned on a boss 87 provided on piston head 83. The valve chamber 82 is in communication with M-1 through inlet port 88 and is also in communication with bellows chamber 78 through port 89 which connects to tube 90 leading to responsive means 20. The end of chamber 82 opposite to port 88 may be provided with a port 91 in communication with atmosphere.

Under normal operating conditions the piston 83 is positioned as shown in Fig. 4 so that unobstructed communication is provided between sensing point M-1 and bellows chamber 78 as in the prior embodiment. Thus pressure deviations from a first selected pressure sensed at M-1 are immediately communicated to pressure area P-1 and the responsive means operates in the manner as indicated in the prior embodiment to controllably admit air through the second passageway means 21 to maintain the first selected uniform pressure.

A second selected uniform pressure to be established at point M-1 may be, for example, a uniform vacuum pressure of ten inches of mercury. Biasing spring 85 is preselected so that when vacuum pressure at M-1 becomes less than the second selected pressure range or ten inches of mercury, piston head 83 moves downwardly to close the first passageway means 19 between port 88 and port 89. At the same time such movement of piston head 83 provides communication of bellows chamber 78 and pressure area P-1 with atmosphere through port 91. Thus characteristics of the responsive means 20 are changed in that pressure P-1 now becomes atmospheric pressure and is the same as pressure P-2. P-1 is no longer in direct communication with sensing point M-1. Pressure areas P-3 and P-4 are still in communication with point M-2. The effective pressure acting against the bellows head 39 has been changed and a greater vacuum pressure must exist at M-2 before vacuum at P-3 will overcome the atmospheric pressure P-2 and the spring rate of the bellows to cause actuation of the valve head 58 of the responsive means 20. Thus when vacuum pressure at M-1 exceeds ten inches of mercury, piston head 83 closes the first passageway means and the responsive means will cooperably effectively operate to admit air at M-2 to maintain the second desired pressure, the exemplary ten inches of mercury.

When vacuum pressure at M-1 becomes less than ten inches of mercury, the piston head 83 will be moved to uppermost position to permit operation of the control means at the first preselected pressure range. Thus when vacuum pressure exceeds ten inches of mercury, the control means will operate to maintain approximately this range for pressure deviations exceeding ten inches of mercury.

It will be readily understood by those skilled in the art that the control means of this invention may not only be utilized in a pressure system including sub-atmospheric pressures but may be used in any pressure system to maintain uniform pressure at the discharge end of a zone through which fluid under pressure passes and which is subject to variable pressure. The control means of this invention selectively limitedly controllably admits fluid under pressure to such a zone in a conduit upstream from the point at which the uniform pressure is desired. It is important to note that this control is attained by the use of two pressure sensing points in the zone of the conduit and that the responsive means is selectively designed with correlated pressure areas and spring rate of a bellows to properly maintain such selected pressure. In a pressure system utilizing above atmospheric pressures the responsive means may be in communication with an auxiliary source of pressure fluid to be admitted through the second passageway means. In certain instances it may be desirable to place the responsive means not in communication with an auxiliary source of pressure fluid but to place said responsive means in communication with a point in the conduit upstream from point M-1 and to reverse the valve 58 so that instead of admitting pressure fluid, pressure fluid may be exhausted in response to pressure deviations above a preselected pressure desired at M-1. In such an arrangement the second passageway means would be disposed upstream from the valved port controllably operated by the responsive means.

It will be understood by those skilled in the art that although the description and disclosure of the invention has been directed primarily to its use on an internal combustion engine, it is clearly understood that the control means may be used on any pressure system wherein a uniform pressure is desired to be maintained at a point in the pressure system normally subject to pressure deviations and that such uniform pressure is maintained by either admitting or exhausting pressure fluid from the pressure system at a point upstream from the point at which a selected uniform pressure is desired. It is understood that various modifications and changes may be made in the control means and method of this invention and all such modifications and changes coming within the scope of the appended claims are embraced thereby.

We claim:

1. A control means for use with an internal combustion engine having carburetor means to introduce fuel mixture into intake manifold means to maintain manifold pressure at a predetermined subatmospheric pressure comprising a first passageway means in communication with the manifold means at a pressure-sensing point; a second passageway means in communication with the manifold means upstream from said pressure-sensing point; pressure responsive means including a hollow valve body provided with a chamber ported to atmosphere; a bellows means in said chamber comprising inner and outer concentrically arranged bellows members defining an outer annular bellows chamber and an inner bellows chamber; a bellows head connected to one end of said bellows means; means connecting said second passageway means to said inner bellows chamber; a valve means connected to the bellows head and extending through the inner bellows chamber into said second passageway means; a valve port in said second passageway means; and a valve head on said valve means for cooperable engagement with said valve port, said outer annular bellows chamber being connected in communication with said first passageway means whereby pressure sensed at said sensing point is transmitted to said bellows means for actuation of said valve means to controllably open said valve port to admit air under atmospheric pressure upstream of the sensing point.

2. A control means for use with an internal combustion engine having carburetor means to introduce fuel mixture to intake manifold means to maintain manifold pressure at a predetermined, subatmospheric pressure comprising a first passageway means in communication with the manifold means at a pressure-sensing point; a second passageway means in communication with the manifold means upstream from said pressure-sensing point; pressure responsive means including a hollow valve body ported to atmosphere; a bellows means within said valve body comprising inner and outer concentrically arranged bellows members defining outer and inner bellows chambers, said outer bellows chamber being in communication with said first passageway means; and a valve means connected to the bellows means and actuated thereby, said valve means including a valved port in said second passageway means to admit gas under pressure to said second passageway means, said second passageway means being in communication with said inner bellows chamber.

3. In a combination as stated in claim 2 wherein said bellows means includes outer and inner bellows members having different spring rates.

4. A control means for use with an internal combustion engine having carburetor means to introduce fuel mixture into intake manifold means to maintain manifold pressure at a predetermined, subatmospheric pressure comprising a first passageway means in communication with the manifold means at a pressure-sensing point; a second passageway means in communication with the manifold means upstream from said pressure-sensing point; pressure responsive means including a bellows means providing a pair of bellows chambers, one of said bellows chambers having communication only with said first passageway means and the other of said bellows chambers having communication with the second passageway means; and valve means operably connected to the bellows means and actuated thereby to controllably admit gas under pressure to the second passageway means in response to pressure variations occurring at said pressure-sensing point.

5. A control means for use with an internal combustion engine having carburetor means to introduce an exhaust gas and fuel mixture into intake manifold means to maintain manifold pressure at a predetermined pressure comprising a first passageway means in communication with the manifold means at a pressure-sensing point; a second passageway means in communication with the manifold means upstream from said pressure-sensing point; and means responsive to deviation of pressure from a preselected pressure at said pressure-sensing point including a bellows means provided with a chamber in communication with said first passageway means and a separate chamber in communication with said second passageway means, and valve means actuated by said bellows means and having communication with auxiliary fluid under pressure for controlling flow of said auxiliary fluid into said second passageway means.

6. A pressure responsive means for use with a fluid pressure system having means for conducting a primary pressure fluid comprising, in combination: a valve body provided with a chamber; a bellows means in said chamber and including an outer bellows member and an inner bellows member concentrically arranged and defining an outer bellows chamber and an inner bellows chamber; a bellows head covering one end of said bellows means; a valve means connected to the bellows head and extending through the inner bellows chamber, said valve body having a valve port for the valve means in communication with a source of auxiliary pressure fluid for controlling flow of auxiliary pressure fluid, means connecting said outer and inner bellows chambers respectively to different zones in said fluid pressure system whereby variation in pressure in said outer and inner bellows chambers actuates said valve means to admit auxiliary pressure fluid through said valve port.

7. A pressure responsive means as stated in claim 6 wherein said outer and inner bellows members are of different spring characteristics.

8. A method of selectively maintaining one of two predetermined subatmospheric pressures in a zone of a conduit connected to atmospheric pressure at one end and a variable low subatmospheric pressure at the other end, the steps of: continuously sensing pressure at spaced points in an open unobstructed zone to maintain a first predetermined subatmospheric pressure, selectively admitting gas at atmospheric pressure into said conduit at a point upstream from said zone in accordance with deviation of pressure sensed at the downstream point, and rendering pressure sensing at said downstream point inoperative at a preselected second subatmospheric pressure at the downstream point to maintain the second predetermined subatmospheric pressure in said zone.

9. A pressure differential responsive valve means for use with fluid conducting means having a pressure zone and spaced pressure sensing points at said zone, comprising: a valve body having a valve port; a valve element guided in said body and cooperable with said valve port to vary the opening of said port; a bellows means connected to said valve element and including a first, second, and third pressure areas: conduit means providing communication between said first pressure area and a first sensing point in said pressure zone; said valve body having a port providing communication of said second pressure area with atmosphere; and a second conduit means having communication with said third pressure area and with a second sensing point in said pressure zone; said first and third pressure areas on said bellows means facing a direction opposite to said second pressure area; said valve port having communication with said second conduit means and second sensing point.

10. A valve means as stated in claim 9 wherein said third pressure area is of less area than the first pressure area.

11. A valve means as stated in claim 9 including a spring means cooperably connected to said valve element to exert a biasing force to normally close said valve element.

12. A control means as stated in claim 5 wherein said auxiliary fluid is exhaust gas.

13. A control means as stated in claim 5 wherein said auxiliary fluid is exhaust gas and wherein duct means provide communication for said exhaust gas to said valve means, said duct means being adapted to be connected to exhaust means.

References Cited in the file of this patent

UNITED STATES PATENTS

| | | |
|---|---|---|
| 1,202,067 | Hulslander | Oct. 24, 1916 |
| 1,211,636 | Spray | Jan. 9, 1917 |
| 1,410,098 | Hamilton | Mar. 21, 1922 |
| 1,474,686 | Platt-Hepworth | Nov. 20, 1923 |
| 1,489,667 | Hamilton | Apr. 8, 1924 |
| 1,996,219 | Thomas | Apr. 2, 1935 |
| 2,124,492 | Marshall | July 19, 1938 |
| 2,154,417 | Anderson | Apr. 18, 1939 |
| 2,421,406 | Bicknell | June 3, 1947 |
| 2,754,185 | Ensign | July 10, 1956 |
| 2,763,285 | Reeves | Sept. 18, 1956 |
| 2,770,251 | Goddard | Nov. 13, 1956 |